(12) United States Patent
Kaminsky et al.

(10) Patent No.: US 7,191,298 B2
(45) Date of Patent: Mar. 13, 2007

(54) FLEXIBLE SYSTEM AND METHOD FOR MIRRORING DATA

(75) Inventors: David L. Kaminsky, Chapel Hill, NC (US); David M. Ogle, Cary, NC (US); Ronald P. Doyle, Raleigh, NC (US); Diane P. Pozefsky, Chapel Hill, NC (US)

(73) Assignee: International Business Machines Corporation, Armonk, NY (US)

( * ) Notice: Subject to any disclaimer, the term of this patent is extended or adjusted under 35 U.S.C. 154(b) by 420 days.

(21) Appl. No.: 10/211,686

(22) Filed: Aug. 2, 2002

(65) Prior Publication Data

US 2004/0024979 A1 Feb. 5, 2004

(51) Int. Cl.
*G06F 12/00* (2006.01)
(52) U.S. Cl. .................. 711/162; 711/161; 707/204
(58) Field of Classification Search ............... 711/161, 711/162; 707/204
See application file for complete search history.

(56) References Cited

U.S. PATENT DOCUMENTS

| | | | | |
|---|---|---|---|---|
| 5,261,094 | A | 11/1993 | Everson et al. ............. | 395/600 |
| 5,640,561 | A | 6/1997 | Satoh et al. ................ | 395/618 |
| 5,812,793 | A | 9/1998 | Shakib et al. .......... | 395/200.31 |
| 5,889,935 | A | 3/1999 | Ofek et al. ............. | 395/182.04 |
| 5,933,653 | A | 8/1999 | Ofek ......................... | 395/826 |
| 5,937,414 | A | 8/1999 | Souder et al. .............. | 707/203 |
| 6,148,383 | A | 11/2000 | Micka et al. ............... | 711/162 |
| 6,157,991 | A | 12/2000 | Arnon ........................ | 711/161 |
| 6,173,377 | B1 * | 1/2001 | Yanai et al. ................ | 711/162 |
| 6,304,882 | B1 | 10/2001 | Strellis et al. ............. | 707/202 |
| 6,496,908 | B1 * | 12/2002 | Kamvysselis et al. ...... | 711/162 |
| 6,728,791 | B1 * | 4/2004 | Young .......................... | 710/5 |

FOREIGN PATENT DOCUMENTS

JP 200047918 7/1998

OTHER PUBLICATIONS

IBM, T.D.B/RD: (11/00) Article 128 (10/93) p. 541-544.
IBM, Research Disclosure-Nov. 2000/2009 #439128, one page.
Euro-Par 200, Parallel Processing, 6th International Euro-Par Conference, Proceedings (Lecture notes in Computer Science vol. 1900), pp. 435-444 Published Berlin Germany, 2000, xxxv+1368pp.

* cited by examiner

*Primary Examiner*—Sanjiv Shah
*Assistant Examiner*—Midys Rojas
(74) *Attorney, Agent, or Firm*—Walter W. Duft

(57) ABSTRACT

A flexible data mirroring system and method are adapted for use in a data processing system having first and second data storage devices. Upon receiving notification of a file update to be written to the first data storage device a mirror mode and mirror event associated with the updated file are determined from mirror information that has been provisioned on a per-file, per-directory or per-volume, etc. basis. The file update is mirrored to the second data storage device according to the provisioned mirror mode and mirror event. If the mirror mode is continuous, the mirror operation proceeds immediately. If the mirror mode is discrete, the file update is noted and the mirror operation proceeds following occurrence of the file's mirror event.

35 Claims, 10 Drawing Sheets

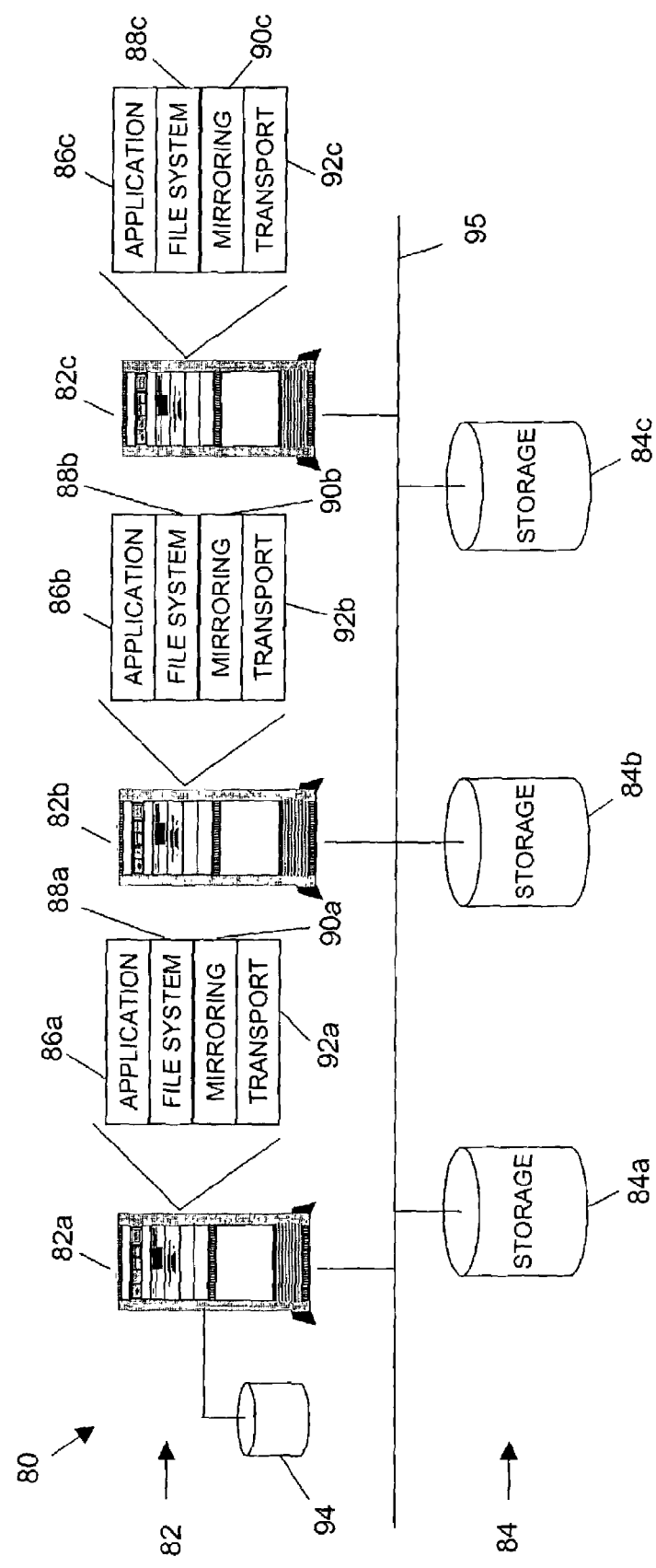

124

| MANAGEMENT TABLE | | | | |
|---|---|---|---|---|
| FILE/DIRECTORY/VOLUME | MODE | EVENTS | TARGET | PACING |
| | | | | |
| | | | | |
| | | | | |
| | | | | |
| | | | | |
| | | | | |
| | | | | |
| | | | | |

| ROUTING TABLE | | |
|---|---|---|
| FILE/DIRECTORY/VOLUME | TARGET | PACING |
| | | |
| | | |
| | | |
| | | |
| | | |
| | | |
| | | |
| | | |

FIG. 9

| DIRTY LIST TABLE | |
|---|---|
| DATA ID. | EVENTS |
|  |  |
|  |  |
|  |  |
|  |  |
|  |  |
|  |  |
|  |  |
|  |  |

FLEXIBLE SYSTEM AND METHOD FOR MIRRORING DATA

BACKGROUND OF THE INVENTION

1. Field of the Invention

The present invention relates to data storage. More particularly, the invention concerns the capture and duplication of information through the use of data mirroring.

2. Description of the Prior Art

By way of background, data mirroring is a procedure whereby data is duplicated into one or more copies that are stored on one or more redundant storage systems for safekeeping. If one storage system fails or the data thereon becomes corrupted or unrecoverable, a mirrored copy can be used in its place. Mirroring solutions come in two general varieties: Continuous and discrete. In continuous mirroring systems, data on a source storage system is copied to a target data storage system each time the data is changed on the source system. The changes are thus immediately mirrored to the target system. In discrete mirroring systems, changes to data are accumulated until an event occurs (e.g., administrator initiation), at which time all of the changes are sent to the target system.

In large storage systems, subsets of data might have different mirroring requirements. For example, files associated with mission-critical data might require mirroring to a primary mirror target each time a file update occurs, somewhat important files might require mirroring to a secondary mirror target upon administrator request, and scratch files might be mirrored to a tertiary mirror target once per day, or might not be mirrored at all. Current mirroring solutions provide no mechanism for tailoring both mirroring levels (i.e., none, discrete or continuous) and data granularity (i.e., file, directory, volume, etc.). Current systems also provide no ability to granularly specify a storage destination as an additional mirroring parameter.

What is therefore needed is a data mirroring method that allows administrators to specify any combination of mirroring type, data granularity, and mirroring destination.

SUMMARY OF THE INVENTION

The foregoing problems are solved and an advance in the art is obtained by a flexible data mirroring system and method adapted for use in a data processing system having at least first and second data storage devices. Upon receiving notification of a file update to be written to the first data storage device, a mirror mode and mirror event associated with the updated file are determined from mirror information that has been provisioned at a desired mirroring granularity level, such as per-file mirroring, per-directory mirroring, per-volume mirroring, etc. The file update is mirrored to the second data storage device according to the provisioned mirror mode and mirror event. If the mirror mode is continuous, the mirroring operation proceeds immediately. If the mirror mode is discrete, the file update is noted and the mirroring operation proceeds following occurrence of the file's mirror event.

In preferred embodiments of the invention, the file update notification is sent by a file system to a mirror services unit associated with the mirroring system. The file update notification may comprise a data block or data block information. Determination of the updated file's mirror mode and mirror event can be performed by the mirror services unit as a lookup in a mirror services table containing the provisioned mirror mode and mirror event information. Updates of discretely mirrored files can be noted by storing an indication of the file update in a dirty list. When the file's mirror event occurs, the stored file update indication can be consulted to determine that mirroring time has arrived. Mirroring may include routing the file update to the second data storage device via a transport layer using destination and pacing information that is provisioned in association with the mirror mode and mirror event information.

The mirror mode and mirror event information can be provisioned by an administrator via a mirror management unit associated with the mirroring system. The mirror management unit can also be used to notify the mirror services unit of mirror event occurrences. The pacing and destination information used for routing file updates may also be provisioned via the mirror management unit.

The invention further contemplates a computer program product that allows flexible mirroring functionality to be added to a data processing system.

BRIEF DESCRIPTION OF THE DRAWINGS

The foregoing and other features and advantages of the invention will be apparent from the following more particular description of preferred embodiments of the invention, as illustrated in the accompanying Drawings, in which:

FIG. 3 is a functional block diagram showing another exemplary data processing environment in which the mirroring system of FIG. 1 can be implemented;

FIG. 4 is a diagrammatic illustration of a computer program product medium storing computer program information that facilitates data mirroring in accordance with the invention;

FIG. 8 is a diagrammatic illustration of a mirror management table maintained by the mirror management unit of FIG. 7;

FIG. 9 is a diagrammatic illustration of a routing table maintained by the mirroring system of FIG. 1;

FIG. 12 is a diagrammatic illustration of a dirty list table maintained by the mirroring system of FIG. 1.

DETAILED DESCRIPTION OF PREFERRED EMBODIMENTS

Figure 1:
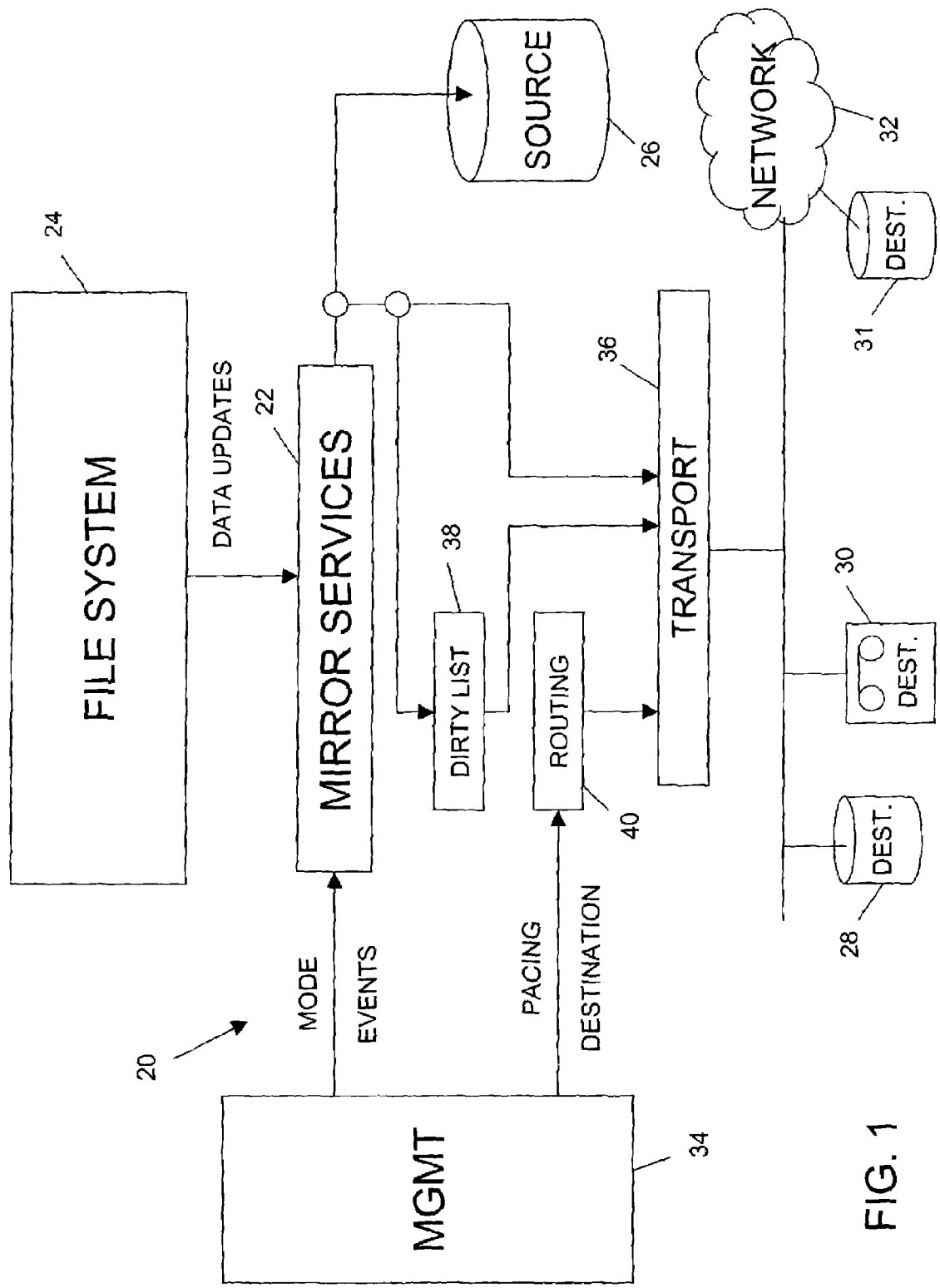
FIG. 1 is a functional block diagram showing a data mirroring system constructed in accordance with the invention.

Turning now to the figures, wherein like reference numerals represent like elements in all of the several views, FIG. 1 illustrates a data mirroring system 20 that is adapted to mirror data in accordance with the invention. The principal component of the mirroring system 20 is a mirror services unit 22. The mirror services unit 22 is adapted to receive data file updates from a file system 24 and to mirror the data file updates according to provisioned mirroring information. As explained in more detail below, the provisioned mirroring information may include, on a per-file, per-directory or per-volume basis, a mirroring mode, one or more mirror destinations, and one or more mirror events. The mirroring system 20 may further include a mirror management unit 34 that is used (1) to provision the mirroring information, (2) to advise the mirror services unit 22 of mirror events, and (3) to optionally direct the routing of data to a mirror destination.

All data corresponding to a data file update is written to a primary data storage resource such as the disk storage system 26. The primary data storage resource will be hereinafter referred to as the "source" storage system. There can be one or several source storage systems. They may be local to the data processing host on which the mirroring system 20 operates, or they may be remote therefrom. The source storage system may also represent a combination of local and remote storage resources.

All data updates designated for mirroring are written to a secondary data storage resource such as the disk storage system 28, the tape storage system 30, or a storage system 31 located somewhere in a data storage network 32. The secondary data storage resource will be hereinafter referred to as the "destination" or "target" storage system. There can be one or several destination storage systems. They may be local to the data processing host on which the mirroring system 20 operates, or they may be remote therefrom. The destination storage system may also represent a combination of local and remote storage resources.

During data processing operations, when the file system 24 implements a file update, it makes various changes to one or more of the data blocks that serve to store the file in the source storage system. The file system 24 also identifies the file update to the mirror services unit 22, which performs the appropriate mirroring action according to the provisioned mirroring information. If the mirroring mode for the updated file is "continuous," the update is immediately passed to a transport layer 36 for mirroring to the destination storage system. If the file's mirroring mode is "discrete," an indication of the update is stored in a dirty list 38. If the file's mirroring mode is "none," no mirroring action occurs. Note that a file can be mirrored both continuously and discretely. For non-mirrored and continuously mirrored files, not further action is required.

For discretely mirrored files, indications of the updates are aggregated in a dirty list 38 until a mirror event occurs. Without limitation, examples of mirror events include system administrator action and scheduled replication. When a mirror event occurs, the mirror services unit 22 retrieves the file data from the source storage system and sends it to the transport layer 36 for mirroring. The dirty list is then cleared of entries pertaining to the mirrored file. It is also possible to correlate a mirror event with a subset of a discretely mirrored file. In that case, only changes relevant to the subset are sent to the transport layer 36 and only dirty list entries pertaining to the subset are cleared from the dirty list 38.

The transport layer 36 can use either synchronous or asynchronous delivery of data to the destination storage system. As indicated above, each file can be mirrored to one or more destinations. If any destination data storage system is located remotely from the transport layer 36, a routing layer 40 can be used to provide necessary destination (routing) and pacing (flow control) information. The mirror management unit 34 can be used to provision the destination and pacing information.

Figure 2:
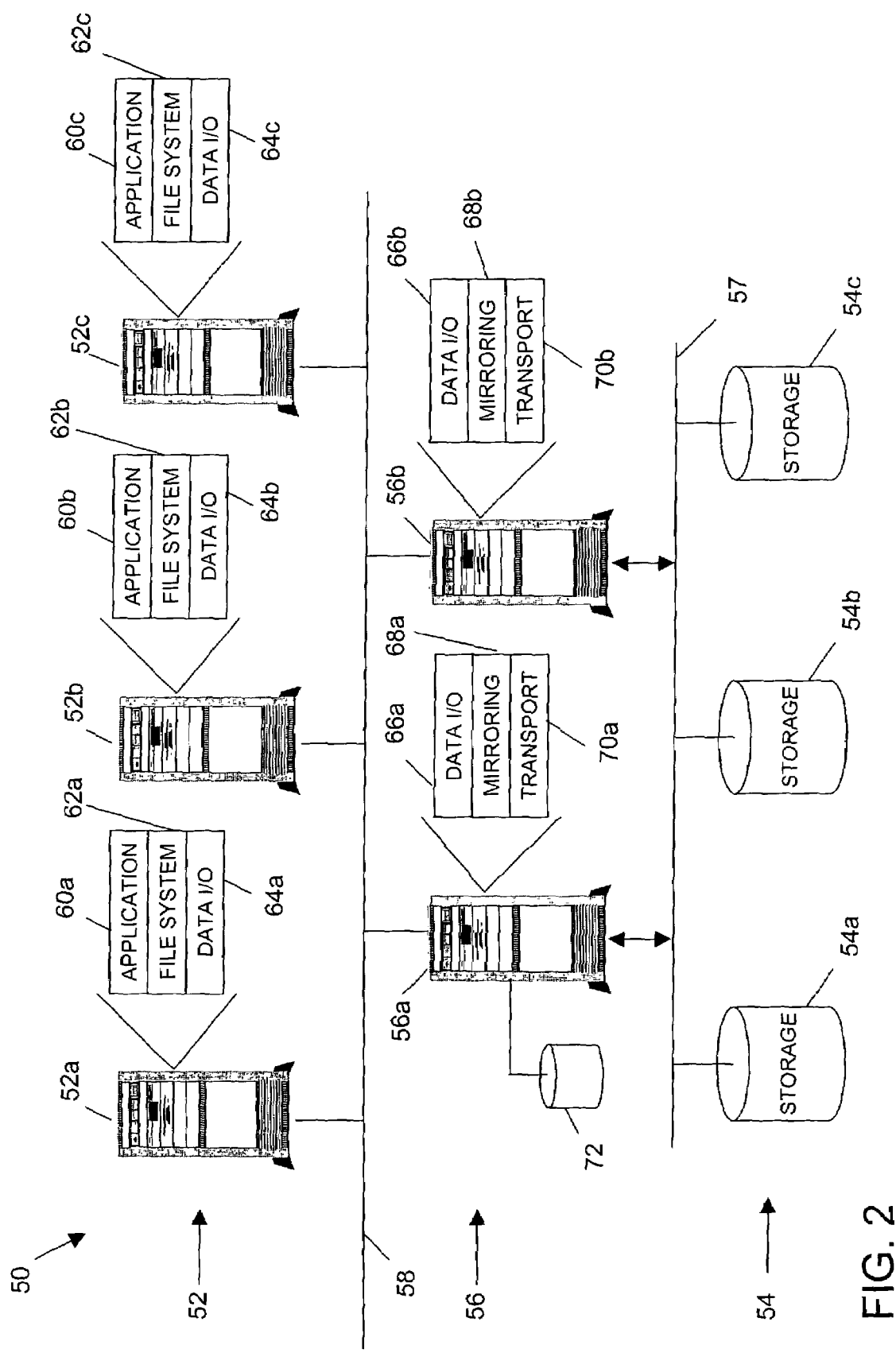
FIG. 2 is a functional block diagram showing an exemplary data processing environment in which the mirroring system of FIG. 1 can be implemented.

Turning now to FIGS. 2 and 3, two exemplary data processing environments are illustrated in which the mirroring system 2 can be implemented. FIG. 2 shows a data processing environment 50 wherein file system nodes 52 store data in a managed data storage pool 54. The data storage pool 54 is managed by storage nodes 56 that handle data read/write requests from the file system nodes 52. The storage nodes 56 connect to the data storage pool 54 by way of a storage network 57. The file systems nodes 52 and the storage nodes 56 communicate with each other across a switched interconnect fabric 58.

Three file system nodes are respectively shown at 52a, 52b and 52c. Each file system node 52a, 52b and 52c respectively hosts a software application 60a, 60b and 60c. Each file system node 52a, 52b and 52c also respectively implements a file system 62a, 62b and 62c, and maintains a data input/output (I/O) layer 64a, 64b and 64c.

Three data storage resources 54a, 54b and 54c are shown to comprise the data storage pool 54. Each data storage resource 54a, 54b and 54c may act as a mirror source or a mirror target (or both) in accordance with the invention.

Two storage nodes are shown at 56a and 56b. Each storage node 56a and 56b respectively implements a data I/O layer 66a and 66b, a mirroring system 68a and 68b in accordance with the invention, and a transport layer 70a and 70b. Storage node 56a also maintains an optional local storage resource 72, which could serve as either a mirror source or a mirror target (or both).

In the data processing environment of FIG. 2, a file update operation would be initiated by one of the software applications 60a, 60b or 60c issuing a data write request. The write request would be handled by the respective file system 62a, 62b or 62c by passing one or more data blocks representing the file update to a respective one of the data I/O layers 64a, 64b or 64c for routing to one of the storage nodes 56a or 56b. The data blocks would be received by a respective one of the data I/O layers 66a or 66b in the storage nodes 56a or 56b and passed to a respective one of the mirroring systems 68a or 68b. Receipt of the data blocks at the mirroring system 68a or 68b serves as a file update notification to that mirroring system. The mirroring system 68a or 68b responds by storing the data blocks in the designated source storage system. If mirroring is required for the data blocks, the mirroring system 68a or 68b performs the mirroring operation by copying the data blocks to the designated destination storage system. If either the source storage system or the destination storage system is within the data storage pool 54, a respective one of the transport layers 70a or 70b will be used to transport the data blocks. If either the source storage system or the destination storage system is not within the data storage pool 54, as in the case of data storage resource 72, the transport layers 70a or 70b might not be used.

FIG. 3 shows a data processing environment 80 in which file system nodes 82 are directly connected to data storage resources in a data storage pool 84. Three file system nodes are respectively shown at 82a, 82b and 82c. Each file system node 82a, 82b and 82c respectively hosts a software application 86a, 86b and 86c. Each file system node 82a, 82b and 82c also respectively implements a file system 88a, 88b and 88c. In addition, each file system node 82a, 82b and 82c respectively implements a mirroring system 90a, 90b and 90c in accordance with the invention, and a transport layer 92a, 92b and 92c. Storage node 82a also maintains an optional local storage resource 94, which could serve as either a mirror source or a mirror target (or both).

Three data storage resources 84*a*, 84*b* and 84*c* are shown to comprise the data storage pool 84. The data storage resources 84*a*, 84*b* and 84*c* connect to each of the file system nodes 82*a*, 82*b* and 82*c* by way of a storage network 95. Each data storage resource 84*a*, 84*b* and 84*c* may act as a mirror source or a mirror target (or both) in accordance with the invention.

In the data processing environment of FIG. 3, a file update operation would be initiated by one of the software applications 86*a*, 86*b* or 86*c* issuing a write request. The write request would be handled by the respective file system 88*a*, 88*b* or 88*c*. The file system 88*a*, 88*b* or 88*c* could handle the write request in several ways. One way would be to store one or more data blocks representing the file update in one of the data storage resources 84*a*, 84*b* or 84*c* by passing the data blocks directly to a respective one of the transport layers 92*a*, 92*b*, 92*c*. In the file system node 82*a*, the data blocks could alternatively be sent to the data storage resource 94. In either case, the data storage resource 84*a*, 84*b*, 84*c* or 94 that writes the data blocks would serve as the source storage system. A notification of the file update could then be sent to a respective one of the mirroring systems 90*a*, 90*b* or 90*c* in the form of data block information (e.g., block and file identifiers).

Another way that the file systems 88*a*, 88*b* and 88*c* could handle a write request would be to pass one or more data blocks representing the file update to a respective one of the mirroring systems 90*a*, 90*b* or 90*c*. The mirroring system would then be responsible for forwarding the data blocks to the designated source storage system. Receipt of the data blocks at the mirroring system 90*a*, 90*b* or 90*c* serves as a file update notification to that mirroring system. The mirroring system responds by storing the data blocks in the designated source storage system. If mirroring is indicated for the data blocks, the mirroring system 88*a*, 88*b* or 88*c* performs the mirroring operation. If either the source storage system or the destination storage system is within the data storage pool 84, one of the respective transport layers 92*a*, 92*b* or 92*c* will be used to transport the data blocks. If either the source storage system or the destination storage system is not within the data storage pool 84, as in the case of data storage resource 94, the transport layers 92*a*, 92*b* or 92*c* might not be used.

There are a variety of commercial data processing systems and software products that may be used to implement the various components shown in FIGS. 2 and 3. The file systems nodes 52*a*, 52*b* and 52*c* of FIG. 2 and 86*a*, 86*b* and 86*c* of FIG. 3, as well as the storage nodes 56*a* and 56*b* of FIG. 2, can all be built from conventional programmable computer platforms that are configured with the software and hardware resources needed to implement their required functions. Exemplary computer platforms include mainframe computers such as an IBM S/390 system running IBM's OS/390 operating system, mid-range computers such as an IBM AS/400 system running IBM's OS/400 operating system, workstation computers such as an IBM RISC/System 6000 system running IBM's Advanced Interactive Executive (AIX) operating system, or any number of microprocessor-based personal computers running a Unix-based operating system or operating system kernel, or a Unix-like operating system or operating system kernel, such as Linux, FreeBSD, etc.

The file systems 62*a*, 62*b*, 62*c* of FIG. 2 can be implemented as instances of a distributed file system such as IBM's General Parallel File System (GPFS). The file systems 88*a*, 88*b* and 88*c* of FIG. 3 can also be implemented as GPFS instances, or may comprise other file system types, such as the IBM's AIX file system.

The interconnect fabric 58 of FIG. 2 can be implemented using IBM's SP-2 switching network or the like. The data I/O layers 64*a*, 64*b*, 64*c*, 66*a* and 66*b* of FIG. 2 can be implemented using IBM's Virtual Shared Disk or Network Shared Disk software interface designed for use with IBM's GPFS. Each node connected to the interconnect fabric 58 will also utilize an appropriate hardware adapter that is consistent with the communication and media technology used to implement the interconnect fabric, such as Fibre Channel, Ethernet or SCSI.

The storage networks 57 and 95 of FIGS. 2 and 3 can be implemented using a Fiber Channel switching fabric or the like. Each node that attaches to the storage networks 57 and 95 will include an appropriate network adapter, such as a Fibre Channel Host Bus Adapter (HBA), that allows it to communicate over the applicable storage network. Any suitable communication and media technology may be used to implement the storage networks 57 and 95.

The data storage resources 54*a*, 54*b*, 54*c* and 72 of FIG. 2, as well as the data storage resources 84*a*, 84*b*, 84*c* and 94 of FIG. 3, can be implemented using a variety of storage system types and configurations, including as RAID arrays, JBOD arrays, intelligent disk subsystems, tape libraries, etc., or any combination thereof.

Each of the mirroring systems 68*a* and 68*b* of FIG. 2 and 90*a*, 90*b* and 90*c* of FIG. 3, can be implemented by programming the host file system node or storage node with data mirroring software that allows the node to perform flexible data mirroring in accordance with the invention. As such, one aspect of the present invention contemplates a computer program product in which such mirroring software is stored in object or source code form on a data storage medium, such as one or more portable (or non-portable) magnetic or optical disks. FIG. 4 illustrates an exemplary computer program product 100 in which the storage medium comprising one or more optical disks. The computer program product 100 can be used by storage network administrators to add flexible mirroring functionality in accordance with the invention to conventional data storage networks. In a typical scenario, one copy of the mirroring software resident on the computer program product 100 will be installed onto each of the storage nodes 56*a* and 56*b* of FIG. 2, or onto each of the file system nodes 82*a*, 82*b* and 82*c* of FIG. 3. The software installation can be performed in a variety of ways, including local installation at each host machine, or over a network via a remote installation procedure from a suitable server host that maintains a copy of the computer program product 100 on a storage medium associated with the server host.

Figure 5:
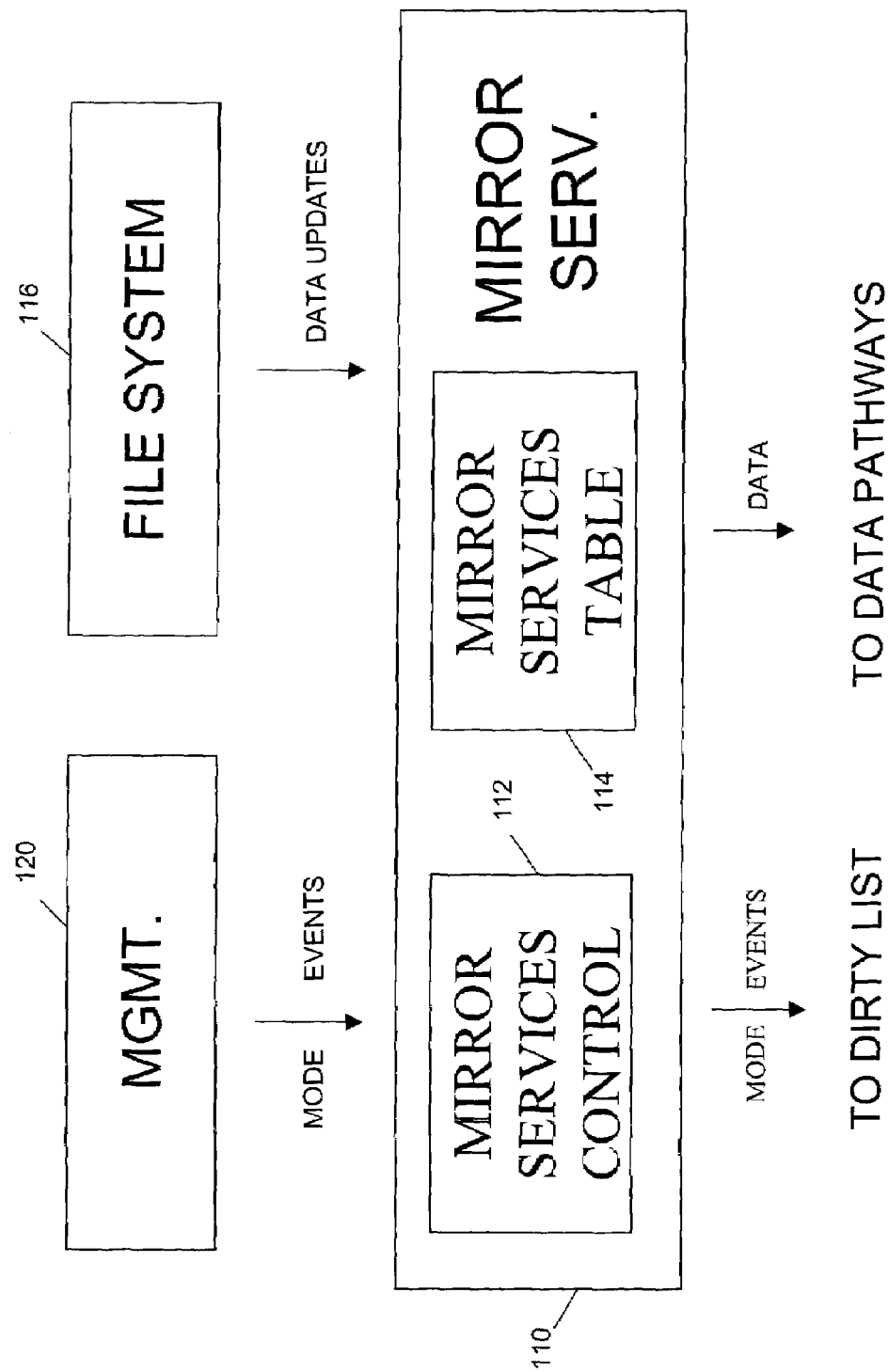
FIG. 5 is a functional block diagram showing a mirror services unit in the mirroring system of FIG. 1.

As described above in connection with FIG. 1, the principal component of the mirroring system of the invention is its mirror services unit. FIG. 5 illustrates the functional elements of an exemplary mirror services unit 10. As can be seen, the mirror services unit 110 includes a mirror services control program 112 and a mirror services table 114. The mirror services control program 112 implements the flexible mirror service functions described above in connection with FIG. 1. Recalling that discussion, when the mirror services unit 110 receives notification of a file update to be written to a designated source storage system (e.g., from a file system 116), it determines a mirror mode and mirror event associated with the updated file from mirror information that has been provisioned on a per-file, per-directory, per-volume, etc. basis. The file update is mirrored as necessary to a designated destination storage system according to the provisioned mirror mode and mirror event information. If the mirror mode is continuous, the mirror operation proceeds immediately. If the mirror mode is discrete, the file update is noted (e.g., using a dirty list) and the mirror operation proceeds following occurrence of the file's mirror event. If the mirror mode is none, no mirroring operation is performed.

Figure 6:
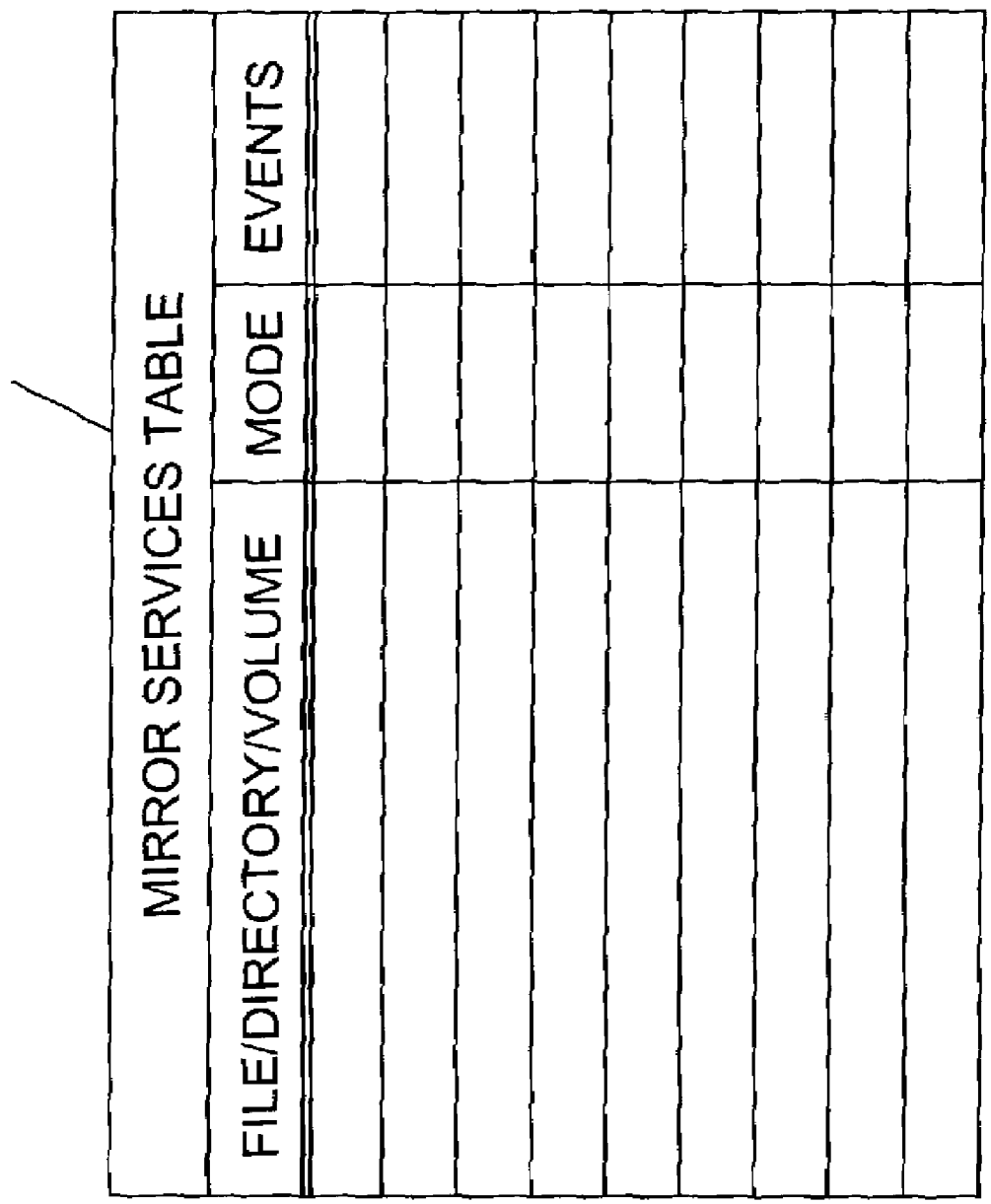
FIG. 6 is a diagrammatic illustration of a mirror services table maintained by the mirror services unit of FIG. 5.

The mirror services table 114 can be used to store the provisioned mirror mode and mirror event information. As shown in FIG. 6, the mirror mode and mirror event information are stored in association with a file identifier that identifies a file, directory, volume, etc., depending on the specified mirroring granularity.

Figure 7:
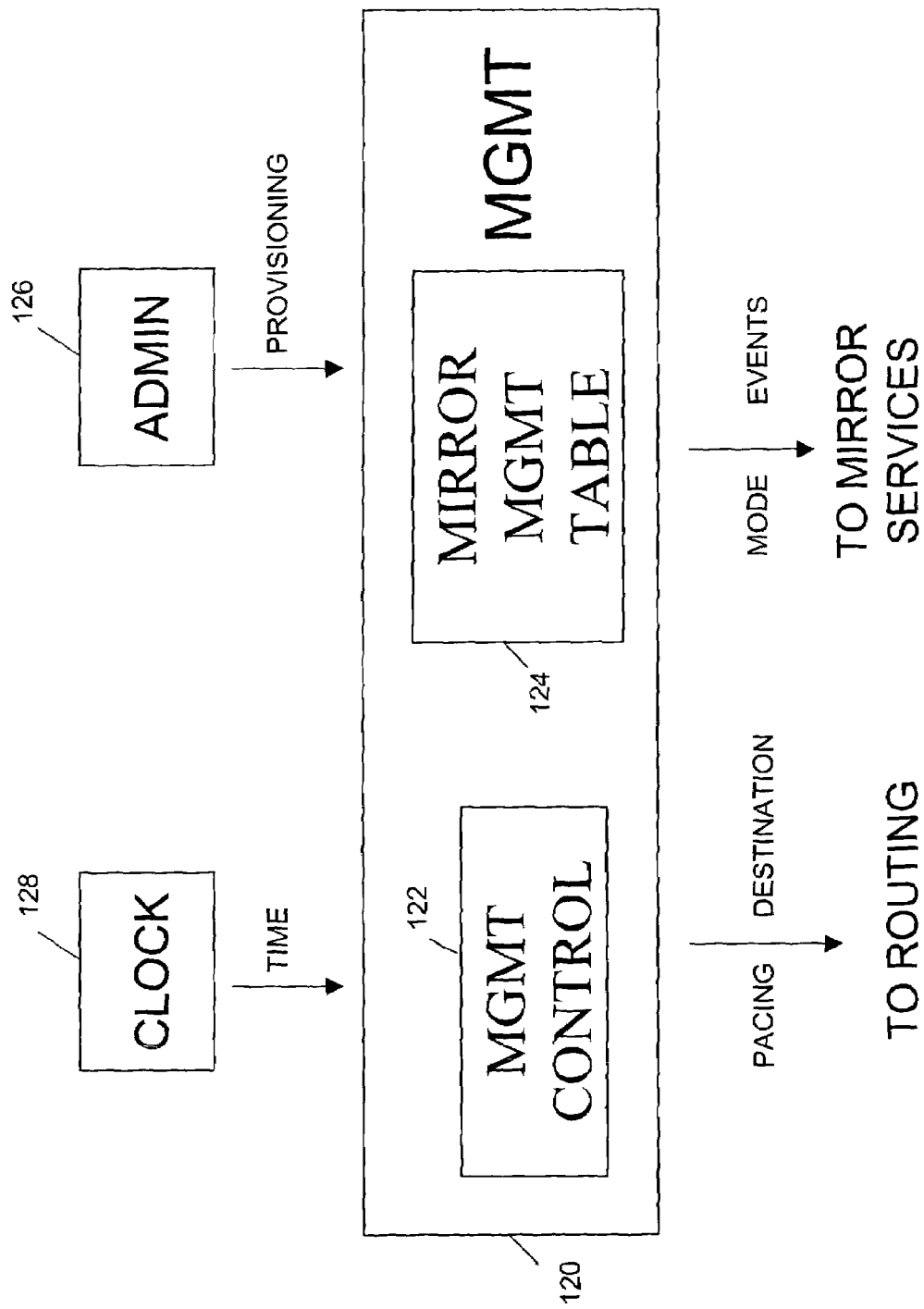
FIG. 7 is a functional block diagram showing a mirror management unit in the mirroring system of FIG. 1.

As described above in connection with FIG. 1, in order to facilitate the provisioning of mirror information stored in the mirror services table 114, as well as the monitoring of mirror events, the mirror services unit 110 may utilize the services of a mirror management unit 120. As can be seen in FIG. 7, the mirror management unit 120 includes a management control program 122 and a mirror management table 124. The management control program 122 implements both the provisioning and event monitoring functions of the mirror management unit 120. The mirror management table 124 could be separate from the mirror services table 114, or the two tables could comprise a single table that is one and the same. In the latter case, the single table could be shared such that both the mirror services control program 112 and the management control program 122 have access thereto. Alternatively, one of the control programs 112 or 122 could control the table while servicing lookup requests from the other control program.

The provisioning function provided by the mirror management unit 120 allows a properly authenticated system administrator 126 to create, modify or delete provisioning entries on a file-by-file basis. To that end, the mirror management unit 120 will present a suitable graphical or text-based user interface to the administrator. When a provisioning entry is created, the administrator specifies the (1) mirroring granularity—that is, which files, directories, volumes etc. will be mirrored, (2) the mirror mode (e.g., whether the mirroring is continuous, discrete, synchronous, or asynchronous, (3) the mirror event(s) that will trigger the mirror operation (e.g., a timer event), and (4) the mirror destination (target) and pacing parameters. To expedite the provisioning process, reasonable default values could be assigned that the administrator could modify as necessary.

Once provisioned, the foregoing information is stored in the mirror management table 124, as shown in FIG. 8. A first subset of the provisioned information comprising the file identifier, the mirror mode, and the mirror event represents the information stored in the mirror services table 114. If the two tables are separate, this first subset of provisioned information will be sent to the mirror services unit 110 in order to maintain concurrency between the two tables. A second subset of the provisioned information comprising the file identifier and the destination and pacing information can be stored in association with the file, directory, volume, etc. identifiers in a routing table 130 maintained by a routing layer, such as the routing layer 40 of FIG. 1. Alternatively, the mirror management table 124 could serve as the routing table and the mirror management control program 122 could be programmed to service lookup requests from the routing layer.

Figure 10:
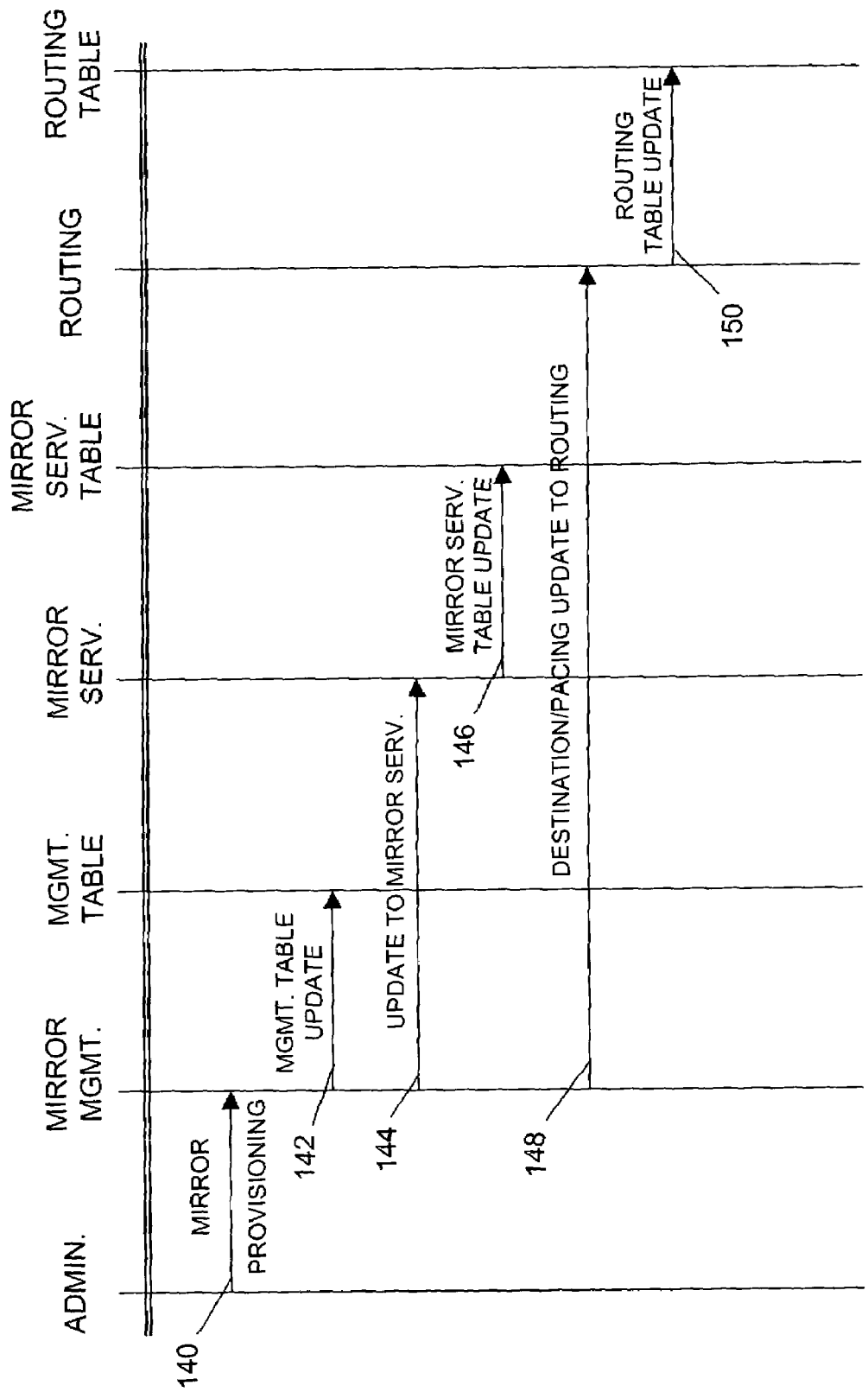
FIG. 10 is a flow diagram showing a mirror information provisioning process in accordance with the invention.

FIG. 10 illustrates the foregoing provisioning procedure and the manner in which provisioned mirror information flows from the administrator to the various components that store the information. In step 140, the administrator inputs mirror provisioning information to the mirror management unit 120. In step 142, the mirror management control program 122 updates the mirror management table 124 with the provisioned information. In step 144, the file identifier (s), the mirror mode(s) and the mirror event(s) contained in the provisioned information are sent to the mirror services unit 110 in the event that a separate mirror services table 114 is maintained. In step 146, the mirror services control program 112 updates the mirror services table 114 accordingly. In step 148, the destination and pacing information contained in the provisioned information are sent to the routing layer 40. In step 150, the routing table 126 is updated accordingly.

The event monitoring function of the mirror management control program 122 allows the mirror management unit 120 to advise the mirror services unit 110 of mirror event occurrences. As shown in FIG. 7, the mirror events can be based on time entries provided by a clock 128, such that mirroring can be scheduled to occur at certain times of the day or at periodic increments, etc. When the mirror management control program 122 receives a timing input that corresponds to a mirroring event, it can scan the mirror management table 124 for affected mirror entries and then notify the mirror services unit 120 of the event and the affected files. Alternatively, the mirror management control program 122 could simply send event notifications to the mirror services unit 110 and allow the mirror services control program 112 to identify files affected by the event.

Figure 11:
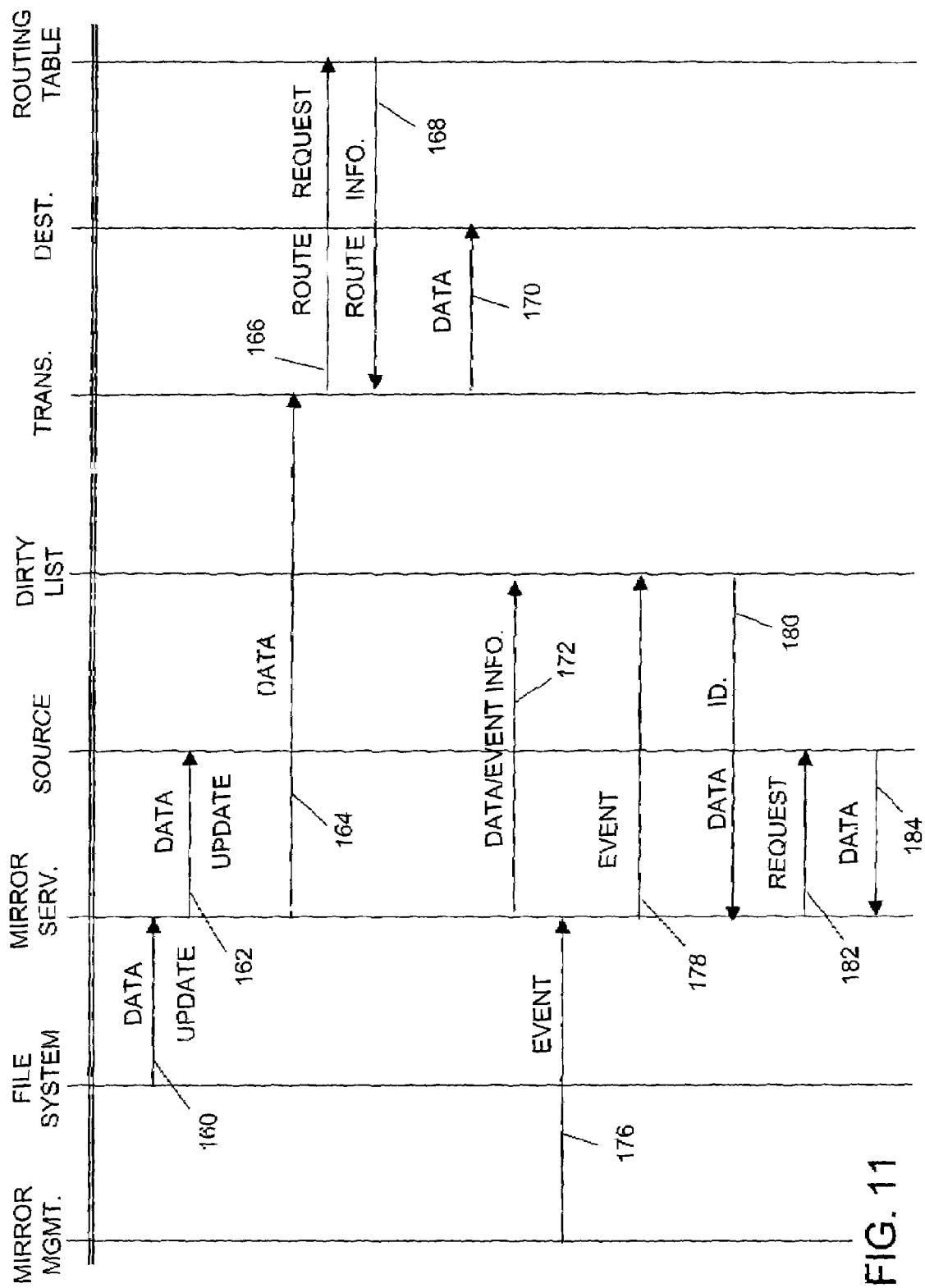
FIG. 11 is a flow diagram showing a data mirroring process in accordance with the invention.

FIG. 11 illustrates the foregoing event processing procedure and the manner in which events are used to initiate the mirroring of updated files. In step 160, the file system 116 notifies the mirror services unit 110 of a file update. It will be assumed that the update notification takes the form of a series of data blocks sent by the file system 116 as part of a write request to the mirror services unit 110. Thus, in step 162, the mirror services unit 110 sends the updated data blocks to the designated source storage system.

During the time period in which the updated data blocks are being stored in the source storage system, the mirror services unit 110 consults the mirror services table 114 to determine the mirror status of the updated data blocks. Note that conventional data blocks contain a device identifier and a block number identifier that allow the data blocks to be sent to the correct storage device and placed at the correct storage location therein. However, mirror information is stored in the mirror services table 114 in association with file, directory, volume, etc. information and not necessarily device and block number information. Thus, will be necessary for the file system 116 to include an identifier with the data blocks (or data block information) that allows the mirror services unit 110 to determine information about the origin of the data blocks. To accommodate different levels of mirroring granularity, the identifier preferably identifies all information needed to perform a lookup in the mirror services table 114. For example, if the mirror system allows the provisioning of mirror information at the per-file, per-directory and per-volume levels, the look-up index to the mirror services table 114 will typically include file names, directory names and volume names. The identifier received from the file system 116 would therefore need to contain all such information. The identifier can be provided by the file system 116 in any suitable fashion, including encapsulating the data blocks in larger information packets that carry the identifier, or by inserting the identifier in the data block header fields. A separate transmission could also be used to apprise the mirror services unit 114 of the identifier.

Once the identifier is received by the mirror services unit 110, it can perform the required look-up in the mirror services table 114. The table lookup will indicate whether the data blocks are to continuously mirrored, discretely mirrored, or not mirrored at all, and also whether the mirroring is synchronous or asynchronous. If the mirror mode is "none," no further action is required. If the mirror mode is "continuous," step 164 is performed and the data blocks are sent to the transport layer, if it is present. If the transport layer requires destination and/or pacing information to forward the data blocks to the destination storage system, it consults the routing table 126 (e.g., using file, directory, volume, etc. information provided by the mirror services unit 110 in association with the data blocks). This step is shown in step 166. In step 168, the requested routing information is returned. In step 170, the transport layer (if present) delivers the data blocks to the destination storage system. Note that if the mirror mode is synchronous, the transport layer may be required to wait for an acknowledgement from the destination storage system before transferring the data blocks. Caching can be used during this time period. If the mirror mode is asynchronous, the data blocks can be immediately forwarded.

Figure 12:
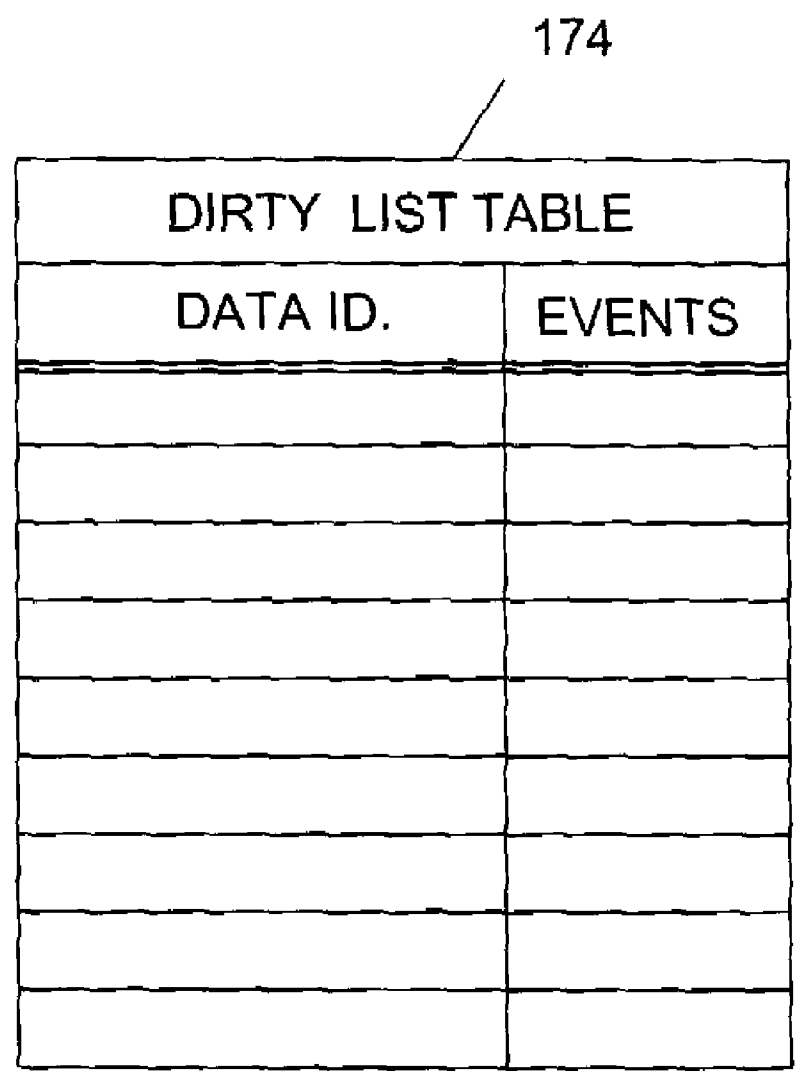

If the mirror mode is discrete, the lookup in the mirror services table 114 will indicate a mirror event that is to be used to trigger the mirroring operation. The mirror services unit 110 will then note the file update and await an occurrence of the mirror event. In particular, the mirror services unit 110 can store an indication of the update in a dirty list, as described above. This is shown by step 172 in FIG. 11. As shown in FIG. 12, the dirty list can be implemented as a dirty list table 174 that stores identifiers corresponding to the updated data blocks in association with a mirror event read from the mirror services table 114.

When an event notification is provided to the mirror services unit 110, as shown in step 176 of FIG. 11, the mirror services unit can pass the event to the dirty list in step 178. The identity of updated data blocks that are associated with the event will be returned to the mirror services unit 110 in step 180. In step 182, the mirror services unit 110 requests the identified data blocks from the source storage system and the data blocks are returned in step 184. Steps 164–170 can then be performed to route the data blocks to the destination storage system.

Accordingly, a data mirroring system and method have been disclosed, together with a computer program product for implementing data mirroring functionality. While various embodiments of the invention have been described, it should be apparent that many variations and alternative embodiments could be implemented in accordance with the invention. It is understood, therefore, that the invention is not to be in any way limited except in accordance with the spirit of the appended claims and their equivalents.

What is claimed is:

1. A data processing apparatus adapted to access first and second storage devices, said data processing apparatus being programmed to:
   accept mirror mode provisioning information assigned at a specified data granularity level from an available set of granularity options that includes file granularity, directory granularity and volume granularity;
   receive notification of a file update to be written to said first data storage device;
   determine a mirror mode associated with said updated file;
   said mirror mode being one of a continuous mirror mode, a discrete mirror mode, and a no-mirror mode;
   said continuous mirror mode being a mode wherein mirroring is performed immediately following each file update, said discrete mirror mode being a mode wherein file updates are accumulated and mirroring is deferred until a mirror trigger event occurs, at which time all accumulated file updates are mirrored, and said no-mirror mode represents a mode wherein no mirroring is performed following a file update;
   determine a mirror trigger event associated with said updated file upon said mirror mode being a discrete mirror mode; and
   mirror said file update to said second data storage device according to said mirror mode and said mirror trigger event.

2. An apparatus in accordance with claim 1 wherein said file update notification is received from a file system.

3. An apparatus in accordance with claim 1 wherein said file update notification comprises a data block or data block information.

4. An apparatus in accordance with claim 1 wherein said mirror mode determination comprises performing a lookup of said provisioned mirror mode information corresponding to said updated file.

5. An apparatus in accordance with claim 1 wherein said mirror trigger event determination comprises performing a lookup of provisioned mirror trigger event information associated with said mirror mode information corresponding to said updated file.

6. An apparatus in accordance with claim 1 wherein said data processing apparatus is further programed to store an indication of said file update if said mirror mode is a discrete mirror mode, and wherein said mirroring includes mirroring said file update upon occurrence of said mirror trigger event.

7. An apparatus in accordance with claim 6 wherein said update indication storage comprises storing said indication of said file update in a dirty list.

8. An apparatus in accordance with claim 6 wherein said mirroring comprises consulting said stored file update indication upon occurrence of said mirror trigger event to determine whether mirroring is required for said updated file.

9. An apparatus in accordance with claim 1 wherein said mirror mode associated with said file and said mirror trigger event associated with said file represent said provisioned information and said mirror mode and mirror trigger event determination comprise performing a lookup of said provisioned information.

10. An apparatus in accordance with claim 9 wherein said mirroring comprises routing said file update to said second data storage device according to destination and pacing information that is provisioned in association with said mirror mode and said mirror trigger event.

11. A computer program product embodied in a tangible media for use in a data processing system having access to first and second storage devices, comprising:
   computer readable program codes coupled to the tangible media for facilitating flexible data mirroring, said computer readable program codes being configured to cause the program to:
   accept mirror mode provisioning information assigned at a specified data granularity level from an available set of granularity options that includes file granularity, directory granularity and volume granularity;
   receive notification of a file update to be written to said first data storage device;
   determine a mirror mode associated with said updated file;

said mirror mode being one of a continuous mirror mode, a discrete mirror mode, or a no-mirror mode;

said continuous mirror mode being a mode wherein mirroring is performed immediately following each file update, said discrete mirror mode being a mode wherein file updates are accumulated and mirroring is deferred until a mirror trigger event occurs, at which time all accumulated file updates are mirrored, and said no-mirror mode represents a mode wherein no mirroring is performed following a file update;

determine a mirror trigger event associated with said updated file upon said mirror mode being a discrete mirror mode; and mirror said file update to said second data storage device according to said mirror mode and said mirror trigger event.

12. A computer program product in accordance with claim 11 wherein said file update notification is received from a file system.

13. A computer program product in accordance with claim 11 wherein said file update notification comprises a data block or data block information.

14. A computer program product in accordance with claim 11 wherein said mirror mode determination comprises performing a lookup of said provisioned mirror mode information corresponding to said updated file.

15. A computer program product in accordance with claim 11 wherein said mirror trigger event determination comprises performing a lookup of provisioned mirror trigger event information associated with said mirror mode information corresponding to said updated file.

16. A computer program product in accordance with claim 11 wherein said program codes are further configured to cause said program to store an indication of said file update if said mirror mode is a discrete mirror mode, and wherein said mirroring includes mirroring said file update upon occurrence of said mirror trigger event.

17. A computer program product in accordance with claim 16 wherein said update indication storage comprises storing said indication of said file update in a dirty list.

18. A computer program product in accordance with claim 16 wherein said mirroring comprises consulting said stored file update indication upon occurrence of said mirror trigger event to determine whether mirroring is required for said updated file.

19. A computer program product in accordance with claim 11 wherein said mirror mode associated with said file and said mirror trigger event associated with said file represent said provisioned information and said mirror mode and mirror trigger event determination comprise performing a lookup of said provisioned information.

20. A computer program product in accordance with claim 19 wherein said mirroring comprises routing said file update to said second data storage device according to destination and pacing information that is provisioned in association with said mirror mode and said mirror trigger event.

21. A mirroring system for flexibly mirroring data, comprising:
a mirror services unit;
a mirror services table associated with said mirror services unit for storing mirror mode information and mirror trigger event information in respective association with one or more file identifiers;
said mirror mode information in said mirror services table being provisioned at a specified data granularity level from an available set of granularity options that includes file granularity, directory granularity and volume granularity; and
a mirror services control unit associated with said mirror services unit adapted to:
perform a lookup in said mirror services table in response to receiving notification of a file update to determine a mirror mode and a mirror trigger event of a file associated with said file update;
mirror said file update to a mirror destination immediately following said file update if said mirror mode is a continuous mirror mode;
store an indication of said file update with other accumulated file update indications if said mirror mode is a discrete mirror mode; and
mirror said flue update and other accumulated file updates to a mirror destination in response to an occurrence of said mirror trigger event.

22. A mirroring system in accordance with claim 21 wherein said file update indication is stored in a dirty list in association with said mirror trigger event.

23. A mirroring system in accordance with claim 22 further comprising:
a mirror management unit;
a mirror management table associated with said mirror management unit for storing provisioned mirror mode information and mirror trigger event information in respective association with one or more file identifiers;
said mirror mode information being provisioned in said mirror management table at a specified data granularity level from an available set of granularity options that includes file granularity, directory granularity and volume granularity; and
a mirror management control unit adapted to:
interface with an administrator to facilitate provisioning of said mirror mode information and said mirror trigger event information in association with one or more files;
providing said provisioned mirror mode information and mirror trigger event information to said mirror services unit for storage in said mirror services table; and
providing an indication of a mirror trigger event occurrence to said mirror services unit.

24. A mirror system in accordance with claim 23 further including a transport layer interconnecting said mirror system to said mirror destination and a routing layer storing destination and pacing information for use by said transport layer in mirroring file updates to said mirror destination.

25. A mirroring system in accordance with claim 24 wherein said mirror management table stores provisioned destination and pacing information in association with said provisioned mirror made and mirror trigger event information, and wherein said mirror management unit comprises means for providing said provisioned destination and pacing information to said routing layer.

26. In a data processing system having access to first and second data storage devices, a flexible data mirror method comprising:
accepting mirror mode provisioning information assigned at a specified data granularity level from an available set of granularity options that includes file granularity, directory granularity and volume granularity;
receiving notification of a file update to be written to said first data storage device;
determining a mirror mode associated with said updated file;
said mirror mode being one of a continuous mirror mode, a discrete mirror mode, and a no-mirror mode;

said continuous mirror mode being a mode wherein mirroring is performed immediately following each file update, said discrete mirror mode being a mode wherein file updates are accumulated and mirroring is deferred until a mirror trigger event occurs, at which time all accumulated file updates are mirrored, and said no-mirror mode represents a mode wherein no mirroring is performed following a file update;

determining a mirror trigger event associated with said updated file upon said mirror mode being a discrete mirror mode; and mirroring said file update to said second data storage device according to said mirror mode and said mirror trigger event.

27. A method in accordance with claim 26 wherein said mirror mode determining step comprises a lookup of said provisioned mirror mode information corresponding to said updated file.

28. A method in accordance with claim 26 wherein an indication of said file update is stored if said mirror mode is a discrete mirror mode, and wherein said mirroring step is performed upon occurrence of said mirror trigger event.

29. A method in accordance with claim 26 wherein said mirror mode associated with said file and said mirror trigger event associated with said file represent said provisioned information and said mirror mode and mirror trigger event determining steps comprise a lookup of said provisioned information.

30. A method in accordance with claim 29 wherein said mirroring step includes routing said file update to said second data storage device according to destination and pacing information that is provisioned in association with said mirror mode and said mirror trigger event.

31. A mirroring system for providing flexible data mirroring in a data processing system, comprising:
 a mirror services unit;
 a mirror services table storing mirror mode information and mirror trigger event information in respective association with one or more file identifiers;
 said mirror mode information in said mirror services table being provisioned at a specified data granularity level from an available set of granularity options that includes file granularity, directory granularity and volume granularity;
 means in said mirror services unit for performing a lookup in said mirror services table in response to receiving notification of a file update to determine a mirror mode and a mirror trigger event of a file associated with said file update;
 means in said mirror services unit for mirroring said file update to a mirror destination immediately following said file update if said mirror mode is a continuous mirror mode;
 means in said mirror services unit for storing an indication of said file update along with other accumulated file update indications if said mirror mode is a discrete mirror mode; and
 means in said mirror services unit for mirroring said file update and other accumulated file updates to a mirror destination in response to an occurrence of said mirror trigger event.

32. A mirrring system in accordance with claim 31 wherein said file update indication is stored in a dirty list in association with said mirror trigger event.

33. A mirroring system in accordance with claim 32 further including a mirror management unit, said mirror management unit comprising:
 means for interfacing with an administrator to facilitate provisioning of said mirror mode information and said mirror trigger event information in association with one or more files;
 a mirror management table storing said provisioned mirror mode information and mirror trigger event information in respective association with one or more file identifiers;
 said mirror mode information being provisioned in said mirror management table at a specified data granularity level from an available set of granularity options that includes file granularity, directory granularity and volume granularity;
 means for providing said provisioned mirror mode information and mirror trigger event information to said mirror services unit for storage in said mirror services table; and
 means for providing an indication of a mirror trigger event occurrence to said mirror services unit.

34. A mirror system in accordance with claim 33 further including a transport layer interconnecting said mirror system to said mirror destination and a routing layer storing destination and pacing information for use by said transport layer in mirroring file updates to said mirror destination.

35. A mirroring system in accordance with claim 34 wherein said mirror management table stores provisioned destination and pacing information in association with said provisioned mirror mode and mirror trigger event information, and wherein said mirror management unit comprises means for providing said provisioned destination and pacing information to said routing layer.

* * * * *